United States Patent [19]
Ayers et al.

[11] 3,863,489
[45] Feb. 4, 1975

[54] ANALYSIS OF CHROMATOGRAPHIC PEAKS BY MOMENTS

[75] Inventors: Buell O. Ayers; Edwin K. Clardy, both of Bartlesville, Okla.

[73] Assignee: Phillips Petroleum Company, Bartlesville, Okla.

[22] Filed: Oct. 19, 1970

[21] Appl. No.: 82,087

Related U.S. Application Data

[63] Continuation-in-part of Ser. No. 873,269, Nov. 3, 1969, abandoned.

[52] U.S. Cl. ............................................. 73/23.1
[51] Int. Cl. ......................................... G01h 31/08
[58] Field of Search ....... 73/23, 23.1, 27; 324/77 R; 307/231; 23/232 C

[56] References Cited
UNITED STATES PATENTS

| | | | |
|---|---|---|---|
| 2,423,377 | 7/1947 | Ferguson | 73/23 X |
| 3,108,929 | 10/1963 | Tolin et al. | 73/23 X |
| 3,278,736 | 10/1966 | Pastoriza | 235/184 |

OTHER PUBLICATIONS

Sternberg – "Extracolumn Contributions to Chromatographic Band Broadening" – Advances in Chromatography – Giddings & Keller, eds. – New York, 1966 – pp. 208–210.

Grubner – "Statistical Moments Theory of Gas–Solid Chromatography: Diffusion Controlled Kinetics" – Advances in Chromatography – Giddings & Keller, eds. – New York, 1968 – pp. 184–186.

*Primary Examiner*—Herbert Goldstein

[57] ABSTRACT

Overlapping peaks in the output of a chromatographic analyzer are resolved by computing the moment of the composite peak and comparing such moment with the corresponding moments of pure samples of the peak constituents.

3 Claims, 3 Drawing Figures

INVENTORS
B. O. AYERS
E. K. CLARDY
BY
Young & Quigg
ATTORNEYS

ANALYSIS OF CHROMATOGRAPHIC PEAKS BY MOMENTS

This application is a continuation-in-part of application Ser. No. 873,269, filed Nov. 3, 1969, now abandoned.

In recent years chromatographic analyzers have been used extensively in various industrial and laboratory operations. A sample of the material to be analyzed is introduced into a column which contains a material that selectively retards passage of the sample constituents. A carrier fluid is then passed through the column to elute the constituents in sequence. However, in some analyses individual constituents have substantially equal affinities for the packing material so that there is an overlapping of the constituents in the column effluent. This makes the interpretation of the output signal quite difficult.

In accordance with this invention, a system is provided for detecting individual peaks in the output signal from a chromatographic analyzer. This is accomplished by calculating the moment of the composite signal with respect to a reference point. Similar moments are calculated with respect to the output of the chromatographic analyzer when individual constituents of the sample are introduced into the column. By comparing the resulting moments of the individual constituents with the moment of the composite peak, it is possible to determine the proportions of the individual constituents in the composite peak.

In the accompanying drawing.

Figure 1:
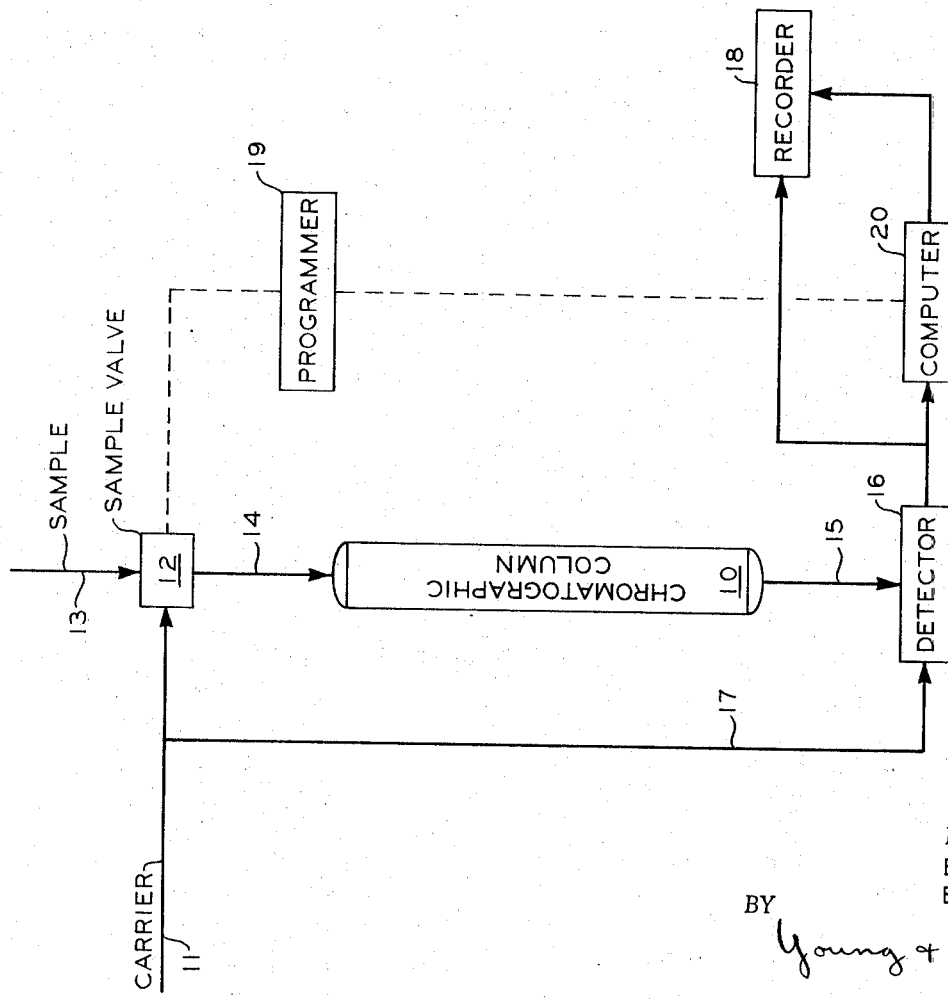
FIG. 1 is a schematic representation of a chromatographic analyzer having the moment computing apparatus of this invention incorporated therein.

Referring now to the drawing in detail and to FIG. 1 in particular, there is shown a chromatographic analyzer which employs a column 10 that is filled with a suitable packing material. A carrier fluid is introduced through a conduit 11 which communicates with a sample valve 12. A sample of material to be analyzed is introduced through a conduit 13 which communicates with valve 12. A conduit 14 extends between the outlet of valve 12 and the inlet of column 10. The effluent from column 10 is directed through a conduit 15 to the first inlet of a detector 16. A portion of the carrier fluid is directed through a conduit 17 to the second inlet of detector 16. Detector 16 can be any suitable instrument which is capable of establishing an output signal that is representative of a difference in composition between the two fluid streams introduced into the detector. Such detectors commonly employ thermistors to compare the thermal conductivities of the two streams. The output signal from detector 16 is applied to the first channel of a recorder 18. A programmer or timer 19 is provided to control the operation of sample valve 12.

Figure 2:
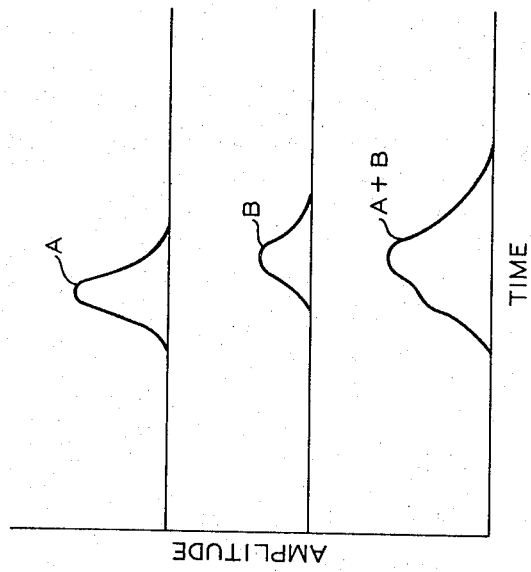
FIG. 2 illustrates typical output signals from the detector of the analyzer of FIG. 1.

The apparatus thus far described constitutes a conventional chromatographic analyzer. Carrier fluid initially passes through valve 12 and column 10 to detector 16 and through conduit 17 to the detector. At the beginning of an analysis cycle, programmer 19 actuates valve 12 so as to introduce a predetermined volume of sample into column 10. This sample is subsequently carried through the column by the flow of carrier fluid. As the individual constituents of the sample appear in column effluent, detector 16 provides an output signal which is applied to recorder 18. This recorded signal normally constitutes a series of peaks which represent the constituents of the sample. If the sample should contain only a single constituent, a signal such as represented by curve A of FIG. 2 may be obtained. If the sample contains only a second single constituent, a signal such as represented by curve B of FIG. 2 may be obtained. However, if both of these constituents appear in the sample, an output signal of the type represented by curve A + B may be obtained. It can readily be seen that it is quite difficult to determine the relative proportions of the individual constituents when a composite curve A + B is recorded. The present invention is directed to the resolution of such a curve.

Figure 3:
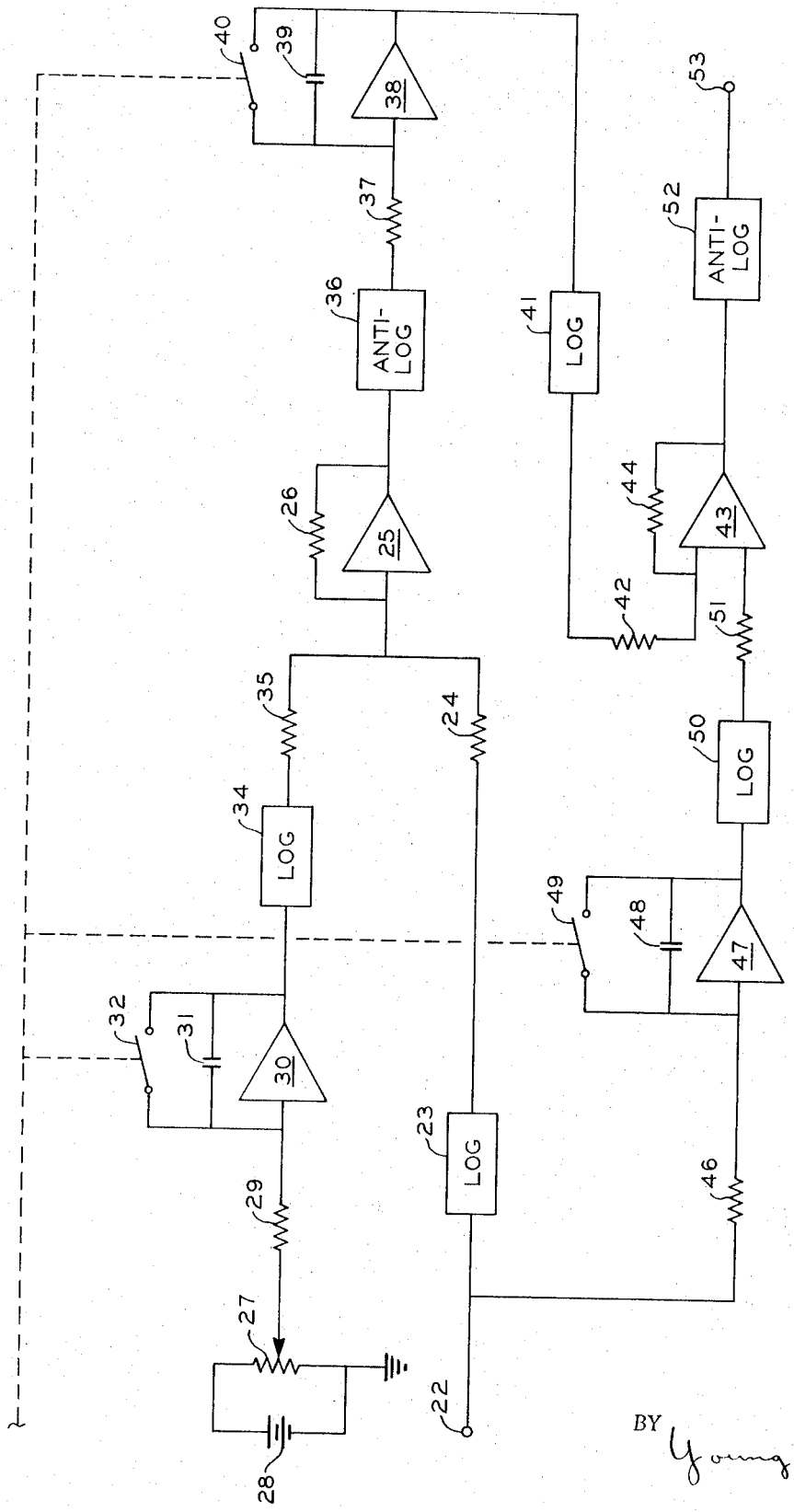
FIG. 3 is a schematic circuit drawing of an embodiment of the computing apparatus employed in the analyzer of FIG. 1.

In accordance with this invention, the output signal from detector 16 is also applied to the input of a computer 20. The output of the computer is applied to a second channel of recorder 18. As previously mentioned, detector 16 provides a signal which is representative of the sample constituents in the effluent from column 10. This signal advantageously is in the form of an electrical voltage, the magnitude of which is representative of the concentration of the sample constituents. The signal from detector 16 is applied to input terminal 22 of the computer circuit which is illustrated in FIG. 3. Terminal 22 is connected to the input of a logarithmic network 23 to establish an output signal which is representative of the logarithm of the amplitude of the input signal. This output signal is applied through an input resistor 24 to a summing amplifier 25, which is provided with a feedback resistor 26.

The second input signal to summing amplifier 25 is obtained from a voltage source 28 which is connected across a potentiometer 27. The contactor of potentiometer 27 is connected through a resistor 29 to the input of an integrating amplifier 30. Amplifier 30 is provided with a feedback capacitor 31 and a reset switch 32. The output signal from amplifier 31 is applied through a logarithmic network 34 and an input resistor 35 to summing amplifier 25.

The output signal from summing amplifier 25 is applied through an anti-logarithmic network 36 and a resistor 37 to the input of a second integrating amplifier 38. Amplifier 38 is provided with a feedback capacitor 39 and a reset switch 40. The output signal from amplifier 38 is applied through a logarithmic network 41 and a resistor 42 to the input of a subtracting amplifier 43, which is provided with a feedback resistor 44. Input terminal 22 is connected through a resistor 46 to the input of an integrating amplifier 47. Amplifier 47 is provided with a feedback capacitor 48 and a reset switch 49. The output signal from amplifier 47 is applied through a logarithmic network 50 and a resistor 51 to the second input of subtracting amplifier 43. The output signal from amplifier 43 is applied through an anti-logarithmic network 52 to an output terminal 53. This terminal is connected to the second channel of recorder 18 of FIG. 1.

The circuit of FIG. 3 is employed to calculate the "moment" of the output signal from detector 16. It will be apparent that this moment corresponds to the first statistical moment, as the term is employed in statistical analysis. Programmer 19 serves to open switches 32, 40 and 49 to start the calculation at a predetermined reference time, which occurs after the appearance of the last prior peak in the output of the detector. This time can be set after a prior calibration curve is obtained. A reference voltage of arbitrary preselected magnitude is established by the setting of the contactor of potentiometer 27. This voltage is integrated with respect to time by integrating amplifier 30. The resulting signal is multiplied by the signal applied to input terminal 22. This multiplication is accomplished by the logarithmic networks and summing amplifier 25. The resulting product is integrated by integrating amplifier 38. The input signal at terminal 22 is also integrated by integrating amplifier 47. The output signal from amplifier 38 is divided by the output signal from amplifier 47 by the logarithmic networks and subtracting amplifier 43. The resulting signal, which is representative of the "moment" of the output signal from detector 16 is applied to recorder 18.

While an analog computer has been shown in FIG. 3, the moments can be computed by means of a digital computer (corresponding to element 20) programmed to make the same calculations. The input signal from detector 16 is converted to digital form by an analog-to-digital converter.

In order to calibrate the apparatus of this invention, a sample containing a preselected quantity of component A alone is first introduced into the analyzer and the moment of the output signal from detector 16 is computed in the manner described. This operation is then repeated with a second sample which contains the same quantity of component B alone. In measuring the moment of an unknown sample containing both component A and component B, the same quantity of sample is employed as was used in computing the moments of A and B alone. This is readily accomplished because sample valve 12 introduces the same predetermined quantity of sample each time. The moment of (A + B) minus the moment of A is proportional to the ratio of component A to components (A + B); and in like manner, the moment of (A + B) minus the moment of B is proportional to the ratio of component B to components (A + B). This permits the relative proportions of components A and B in a composite peak of (A + B) to be determined from the calculated moments. The percentage of component A (%A) in the unknown sample is obtained from the following equation:

$$\text{Percent A} = \frac{\text{Moment (A + B)} - \text{Moment A}}{\text{Moment B} - \text{Moment A}} \times 100 \quad (1)$$

The percentage of component B (%B) is equal to 100 − %A.

In a specific example of the operation of this invention, sample mixtures of butene-1 and isobutylene were analyzed in a column packed with crushed firebrick coated with squalane. Hydrogen was employed as the carrier gas. The sample volumes were about 150 microliters. Samples of pure butene-1 (component A) and pure isobutylene (component B) were first analyzed separately in the column, and moments were computed by a digital computer which was programmed to compute moments in accordance with the mathematical operations performed by the circuit of FIG. 3. Known mixtures containing 25%A - 75%B, 50%A - 50%B, and 75%A - 25%B were also analyzed. The same volume of sample was employed in each analysis. The computed moments for the several samples were as follows:

| Run No. | Sample Composition | Computed Moment |
|---------|--------------------|-----------------|
| 1 | 100%A | 6.32 |
| 2 | 25%A - 75%B | 7.10 |
| 3 | 50%A - 50%B | 7.87 |
| 4 | 75%A - 25%B | 8.60 |
| 5 | 100%B | 9.48 |

By substituting the foregoing computed moments into Equation (1), the calculated percentages of component A for Runs 2, 3 and 4 are 24.7%, 49.1% and 72.2%. While these values are not in perfect agreement with the known compositions, they are quite acceptable for quantitative analysis by chromatography. In the absence of the procedure of this invention, it would be quite difficult even to recognize the individual peaks. The foregoing computations can be made from the recorded data, or the output signals from computer 20 can be applied to a computer with a storage means and the computations can be made automatically.

While this invention has been described in conjunction with a presently preferred embodiment, it obviously is not limited thereto.

What is claimed is:

1. The method of obtaining data useful in determining the relative concentrations of first and second constituents of a fluid mixture by chromatography when said constituents have approximately the same retention times, which method comprises:

introducing into a chromatographic analyzer a sample of the fluid mixture, and operating the analyzer to produce a first chromatogram wherein the composition of the analyzer effluent is measured with respect to time;

introducing into said analyzer a sample of said first constituent, and operating the analyzer to produce a second chromatogram wherein the composition of the analyzer effluent is measured with respect to time;

introducing into said analyzer a sample of said second constituent, and operating the analyzer to produce a thrid chromatogram wherein the composition of the analyzer effluent is measured with respect to time; and computing the moments of the peaks of said constituents in each of said chromatograms with respect to a common reference point of time, whereby a comparison of the resulting moments provides an indication of the relative amounts of said first and second constituents in the first chromatogram.

2. The method of claim 1 wherein each of said moments is calculated by establishing a reference signal of predetermined magnitude, establishing an output signal from the chromatographic analyzer representative of the respective chromatogram, integrating the reference signal with respect to time and establishing a first signal representative of the resulting integral, multiplying said first signal by said output signal and establishing a second signal representative of the resulting product, integrating said second signal with respect to time and establishing a third signal representative of the resulting integral, integrating said output signal with respect to time and establishing a fourth signal representative of the resulting integral, and dividing the third signal by the fourth signal to establish a final output signal representative of the resulting moment.

3. The method of claim 1, further comprising computing the percentage of the first constituent in the fluid mixture by the following equation:

$$\text{Percent A} = \frac{\text{Moment (A + B)} - \text{Moment A}}{\text{Moment B} - \text{Moment A}} \times 100,$$

where A and B represent the first and second constituents, respectively, and the indicated moments are the computed moments of the peaks.

* * * * *